US010899223B2

(12) United States Patent
Arras et al.

(10) Patent No.: US 10,899,223 B2
(45) Date of Patent: Jan. 26, 2021

(54) METHOD FOR TESTING THE TIGHTNESS OF A FUEL SUPPLY SYSTEM

(71) Applicant: Bayerische Motoren Werke Aktiengesellschaft, Munich (DE)

(72) Inventors: Emmanuel Arras, Munich (DE); Markus Huber, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 220 days.

(21) Appl. No.: 15/964,517

(22) Filed: Apr. 27, 2018

(65) Prior Publication Data

US 2018/0244148 A1   Aug. 30, 2018

Related U.S. Application Data

(63) Continuation of application No. PCT/EP2016/070665, filed on Sep. 1, 2016.

(30) Foreign Application Priority Data

Oct. 28, 2015  (DE) .......................... 10 2015 221 053

(51) Int. Cl.
*B60K 15/035*   (2006.01)
*F02M 25/08*   (2006.01)

(52) U.S. Cl.
CPC ..... *B60K 15/03504* (2013.01); *F02M 25/089* (2013.01); *F02M 25/0809* (2013.01); *F02M 25/0818* (2013.01); *F02M 25/0836* (2013.01)

(58) Field of Classification Search
CPC ......... B60K 15/03504; F02M 25/0809; F02M 25/0818; F02M 25/0836; F02M 25/089
(Continued)

(56) References Cited

U.S. PATENT DOCUMENTS 5,146,902 A * 9/1992 Cook ................. F02M 25/0818
                                                    123/198 D
5,460,135 A * 10/1995 Ohashi ................... B60K 15/03
                                                    123/518
(Continued)

FOREIGN PATENT DOCUMENTS

DE    10 2008 046 586 A1    3/2010
DE    10 2012 212 109 A1    5/2014
(Continued)

OTHER PUBLICATIONS

International Search Report (PCT/ISA/210) issued in PCT Application No. PCT/EP2016/070665 dated Nov. 2, 2016 with English translation (seven pages).

(Continued)

*Primary Examiner* — Peter J Macchiarolo
*Assistant Examiner* — Monica S Young
(74) *Attorney, Agent, or Firm* — Crowell & Moring LLP

(57) ABSTRACT

A method for testing the tightness of a fuel supply system of a motor vehicle is provided. The fuel supply system includes a volume-changing element provided in the fuel tank, the volume of which volume-changing element is in contact with the environment. The fuel tank is customarily sealed off against the environment by way of a valve unit. For testing the tightness, a differential pressure with respect to environment is generated in the tank by way of a gas conveying device, sequentially and thus not simultaneously, the volume-changing element being sealed off against the environment, and the volume-changing element not being sealed off against the environment, a differential pressure with respect to environmental pressure is generated in the volume-changing element or in the tank. The differential pressures are maintained and monitored over a certain period of time, and if after this period of time, the differential pressures still (Continued)

exceed a certain threshold value, a sufficient tightness of the fuel supply system is concluded.

10 Claims, 4 Drawing Sheets

(58) Field of Classification Search
USPC .......................................................... 73/49.2
See application file for complete search history.

(56) References Cited

U.S. PATENT DOCUMENTS

| | | | | |
|---|---|---|---|---|
| 5,868,120 | A * | 2/1999 | Van Wetten | B60K 15/03504 |
| | | | | 123/518 |
| 5,925,817 | A * | 7/1999 | Kidokoro | B60K 15/03 |
| | | | | 73/40 |
| 6,446,614 | B1 * | 9/2002 | Matsuoka | F02D 29/06 |
| | | | | 123/516 |
| 2002/0162457 | A1 * | 11/2002 | Hyodo | F02M 25/089 |
| | | | | 96/109 |
| 2003/0136182 | A1 | 7/2003 | Streib | |
| 2014/0197188 | A1 * | 7/2014 | Criel | B60K 15/03519 |
| | | | | 220/746 |
| 2014/0277927 | A1 * | 9/2014 | Guo | F02M 25/0818 |
| | | | | 701/34.4 |
| 2016/0167510 | A1 * | 6/2016 | Weigl | F02M 25/0818 |
| | | | | 73/49.2 |
| 2017/0087980 | A1 | 3/2017 | Arras et al. | |
| 2018/0080415 | A1 * | 3/2018 | Kishi | F02M 25/0872 |

FOREIGN PATENT DOCUMENTS

| | | |
|---|---|---|
| DE | 10 2013 209 716 A1 | 11/2014 |
| EP | 1 028 017 A2 | 8/2000 |
| WO | WO 01/69073 A1 | 9/2001 |
| WO | WO 2016/012284 A1 | 1/2016 |

OTHER PUBLICATIONS

German-language Written Opinion (PCT/ISA/237) issued in PCT Application No. PCT/EP2016/070665 dated Nov. 2, 2016 (five pages).

German-language Search Report issued in counterpart German Application No. 10 2015 221 053.7 dated Jul. 18, 2016 with partial English translation (12 pages).

International Search Report (PCT/ISA/210) issued in PCT Application No. PCT/EP2016/070667 dated Nov. 2, 2016 with English-language translation (seven pages).

German-language Written Opinion (PCT/ISA/237) issued in PCT Application No. PCT/EP2016/070667 dated Nov. 2, 2016 (five pages).

German-language Search Report issued in counterpart German Application No. 10 2015 221 055.3 dated Jul. 15, 2016 with partial English-language translation (11 pages).

\* cited by examiner

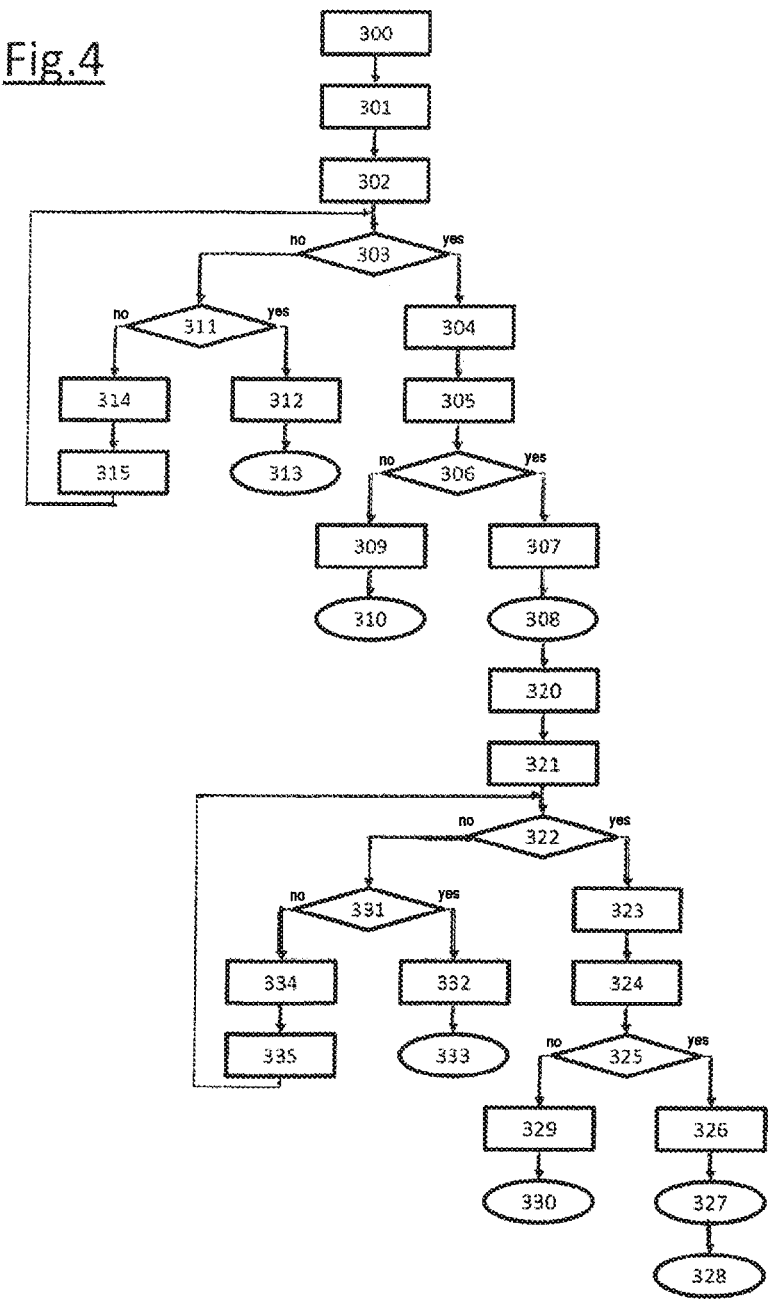

METHOD FOR TESTING THE TIGHTNESS OF A FUEL SUPPLY SYSTEM

CROSS REFERENCE TO RELATED APPLICATIONS

This application is a continuation of PCT International Application No. PCT/EP2016/070665, filed Sep. 1, 2016, which claims priority under 35 U.S.C. § 119 from German Patent Application No. 10 2015 221 053.7, filed Oct. 28, 2015, the entire disclosures of which are herein expressly incorporated by reference.

This application contains subject matter related to U.S. application Ser. No. 15/964,861, entitled "Method for Checking the Tightness of a Fuel Supply System" filed on even date herewith.

BACKGROUND AND SUMMARY OF THE INVENTION

The invention relates to a method for testing the leaktightness of a fuel supply system of a motor vehicle, including a fuel tank, in the interior space of which there is provided a volume-changing element, the so-called compensation volume of which is normally connected, in particular with the interposition of an accumulator unit for gaseous fuel constituents, to the surroundings. The interior space of the fuel tank, which can be filled with fuel for a consumer, is connectable to the surroundings by way of a valve unit which is normally open during the filling of the fuel tank and in the event of an exceedance of a positive-pressure threshold value in the region of up to 100 mbar and in the event of an undershooting of a negative-pressure threshold value. The "positive pressure" and "negative pressure" relate to the difference between the pressure in the tank interior space and the ambient pressure. The valve unit is otherwise closed. A fuel supply system of said type is described in the international patent application with the file reference PCT/EP2015/065891.

The legal requirements placed on the prevention of emissions from motor vehicle tank systems have over time become extremely high. Under virtually all conceivable circumstances, taking into consideration different country-specific regulations (e.g., the different nations of the world issue different regulations), practically no gaseous fuel constituents (e.g., these are normally hydrocarbons) should pass out of the interior space of the tank into the surroundings. As is known, particularly large quantities of such gaseous fuel constituents are encountered during the filling of the fuel tank with fresh fuel, but also as a result of a temperature increase in the case of the motor vehicle being at a standstill for a relatively long period of time. In conjunction with the latter, a person skilled in the art is familiar with the expression "diurnal losses", that is to say the losses of gaseous fuel constituents, or the quantity of gaseous hydrocarbon emissions, that must be discharged from the tank interior space owing to temperature fluctuations (for example resulting from the change between day and night) when the motor vehicle is at a standstill for a relatively long period of time in order to prevent the generation of inadmissibly high positive pressure in the tank interior space. It is however also necessary to discharge hydrocarbon emissions that form in the tank owing to temperature changes during the operation of the motor vehicle. In each case, the adherence to vapor pressure equilibrium in the tank leads to such emissions. As is known, at least these emissions that do not occur during the filling of the fuel tank are temporarily stored in an activated carbon filter or the like, which in the present application is generally referred to as accumulator unit for gaseous fuel constituents, until an internal combustion engine which is supplied with fuel from the fuel tank (and which is normally provided as a vehicle drive unit) is suitably set in operation such that said accumulator unit can then be purged. The fuel constituents temporarily stored in the activated carbon filter are supplied to the internal combustion engine for combustion. For the sake of completeness, it is also pointed out that, in specific countries, it is conventional for hydrocarbon emissions that occur during the filling of the tank either to be suctioned off during the filling process at the refueling station itself (for example, "ECE system" in the European Union) or to likewise be stored in a then adequately large-dimensioned activated carbon filter or in a corresponding storage unit (for example, ORVR (Onboard Refueling Vapor Recovery) in the USA).

With regard to an avoidance of the above-mentioned "diurnal losses" or other operational hydrocarbon emissions, pressure tanks have already been proposed, or are already in series production, in which a correspondingly high positive pressure (and a low negative pressure) can prevail such that no discharge of fuel vapors from the tank need occur other than in extreme exceptional circumstances, but such pressure tanks are highly cumbersome. Also known are measures for reducing the formation of gaseous fuel constituents in the tank interior space, in particular in conjunction with a filling process of the fuel tank, as in, for example, U.S. Pat. No. 5,460,135. Specifically, for the USA, it is the case that all gaseous hydrocarbon emissions that occur during the filling of a vehicle fuel tank must be temporarily stored in a storage unit for gaseous fuel constituents situated on board the vehicle. To reduce the quantity of such gaseous hydrocarbon emissions, said cited document provides, in the fuel tank, a flexible air bladder which exhibits its minimum volume when the tank is completely filled with fuel and which is continuously filled with ambient air during the extraction of liquid fuel from the tank, whereas an evacuation of said air bladder is prevented. Therefore, it is self-evidently possible for only a smaller quantity of fuel vapors to form above the liquid level in the tank than in an otherwise identical tank without an air bladder of said type. In conjunction with refilling of the tank, said air bladder is then evacuated into the surroundings through the storage tank or activated carbon filter.

The international patent application with the file reference PCT/EP2015/065891 as cited above has described a fuel supply system, the functional principle of which is based on the recognition that, owing to the vapor pressure equilibrium in a fuel tank which is almost completely filled with liquid fuel, fewer gaseous fuel constituents form above the liquid level than in the same fuel tank when the latter is only, for example, half full or less. Consequently, with a flexible air bladder or the like which is provided above the liquid level formed by liquid fuel in the tank interior space, the quantity of fuel constituents that transition into the gaseous state in the tank interior space can be reduced. In said patent application, and also in the present case, reference will be made below not to an "air bladder," but more generally to a volume-changing element which has or encloses a variable compensation volume which is or can be connected to the surroundings. Accordingly, the volume-changing element can breathe, as it were, that is to say can become larger or smaller in accordance with demand and thus react to changed boundary conditions.

A (further) legal licensing requirement for motor vehicles for example in the United States of America is that the entire region of the fuel supply system in which gaseous fuel constituents can be present is automatically checked for leak-tightness at regular intervals. Normally, such leak-tightness tests are performed by way of an electronic control unit during every driving cycle or every second driving cycle of the motor vehicle. Here, a leak, for example in the form of a hole with a diameter of only 0.5 mm, must be immediately detected, and the existence of such a leak must be indicated to the user of the motor vehicle. For this purpose, in the customary prior art, in that region of the fuel supply system in which gaseous fuel constituents can be present, the pressure and the temperature (of the gases situated in said region or, in the case of sensors being arranged in an upper region of the fuel tank, if the latter is completely filled, also of the liquid fuel situated there) are detected by way of suitable sensors over a certain time period. Said region also includes the fuel vapor intermediate store.

It is an object of the present invention to specify, for a fuel supply system, e.g., according to the above-cited international patent application with the file reference PCT/EP2015/065891, a suitable method for testing the leak-tightness thereof.

This and other objects are achieved, by a method for testing a leak-tightness of a fuel supply system of a motor vehicle, wherein, by way of a gas-conveying device, sequentially and therefore not simultaneously,
(a) a differential pressure in relation to the surroundings is generated in the tank interior space with the volume-changing element shut off with respect to the surroundings, and
(b) a differential pressure in relation to ambient pressure is generated in the volume-changing element or in the tank interior space with the volume-changing element not shut off with respect to the surroundings,
wherein, through switching of suitable shut-off valves, the generated differential pressure from (a) and the generated differential pressure from (b) are held and monitored over a certain (or predetermined) period of time or inspected after a certain (or predetermined) period of time,
and wherein, if the differential pressure still exceeds a certain (or predetermined) threshold value after this time period, adequate leak-tightness of the fuel supply system is inferred.

The present invention also relates to advantageous refinements.

It is firstly pointed out that, with regard to the features of a fuel supply system relevant for the present invention, reference is made to the full content of the cited international patent application with the file reference PCT/EP2015/065891, which does not constitute a prior publication, that is to say it is the intention for the entire content of said document to be incorporated into the content of the present patent application. Therefore, further below, two exemplary embodiments of the present invention will be described on the basis of a fuel supply system which is illustrated in FIG. 1 of, and described in detail in, the above-cited international patent application.

According to an embodiment of the invention, a leak-tightness test of a fuel supply system of said type or of a fuel supply system similar thereto is performed in that, firstly, a leak-tightness test is performed in a part of said fuel supply system which does not include said volume-changing element. The volume-changing element or the so-called compensation volume thereof is not connected to the surroundings, so as to rule out any influences thereof on this part of the fuel supply system. Furthermore, a leak-tightness test for the volume-changing element or for the other part, which includes said volume-changing element, of the fuel supply system is performed, wherein this may take place either directly or indirectly, as discussed below. Here, it is basically the case for each leak-tightness test that, by way of a gas-conveying device (in particular in the form of an air pump driven by electric motor), a certain (predefined) differential pressure (in relation to ambient pressure) is generated in a part of the fuel supply system. Thus, the gas-conveying device is deactivated and, as a result of suitable valves in the respective part of the fuel supply system being shut off, said generated differential pressure (for example negative pressure) should exist for a certain period of time if said part of the fuel system exhibits adequate leak-tightness. Accordingly, the value of said differential pressure (for example negative pressure) is queried or checked again at least after the expiry of a certain (predefined) time period. If a change in said differential pressure value lies below a certain suitably predefined pressure value, the respective part of the fuel supply system can consequently be regarded as exhibiting adequate leak-tightness; otherwise, there is a substantiated suspicion of a leak.

For the testing of the leak-tightness of that part of the fuel supply system which does not include the volume-changing element, that is to say in the tank including the storage unit for fuel vapors and the purge line thereof, the gas-conveying device is used to generate a differential pressure in relation to, and preferably a positive pressure in relation to, ambient pressure in said part. For the testing of the leak-tightness of the volume-changing element or of the other part, which includes said volume-changing element, of the fuel supply system, a differential pressure in relation to ambient pressure can be generated either in the volume-changing element itself—this is then what is referred to below as a "direct" test—or in the fuel tank, that is to say in the tank interior space, wherein the latter is an "indirect" test. Specifically, if the fuel tank has been identified as being leak-tight in a method step preceding the testing of the leak-tightness of the volume-changing element, and, for example, a negative pressure is thereupon generated in the interior space of the tank, said negative pressure will then, if a leaking volume-changing element is not shut off with respect to the surroundings, inevitably be depleted by ambient air that passes into the tank interior space through the leaking volume-changing element.

In a particularly advantageous embodiment of the present invention, a single gas-conveying device is provided for the testing of both of said parts of the fuel supply system. The single gas-conveying device can be assigned selectively to one of the two parts of the fuel supply system, for example, by way of suitably switchable valves. The gas-conveying device may be configured with a reversible conveying direction such that a positive pressure or negative pressure can be selectively generated by way thereof. For example, in a first step of a method according to the embodiment of the invention, a gas-conveying device of said type may be used to generate a certain positive pressure in the tank interior space and in fluid lines connected thereto by conveying air out of the surroundings. After a positive conclusion to said first part of the test process, in a second step, the same gas-conveying device may be used to generate a negative pressure in the tank interior space in order to perform the indirect leak-tightness test, discussed in the preceding paragraph, for the volume-changing element. It may however alternatively be advantageous, on the basis of some other criterion, for a dedicated gas-conveying device (with a supply of air from the surroundings) to be provided for each of said parts of the fuel supply system, which gas-conveying devices are then preferably operated successively in terms of time.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 is a flow diagram of a computer program installed in an electronic control unit.

DETAILED DESCRIPTION OF THE DRAWINGS

Figure 1:
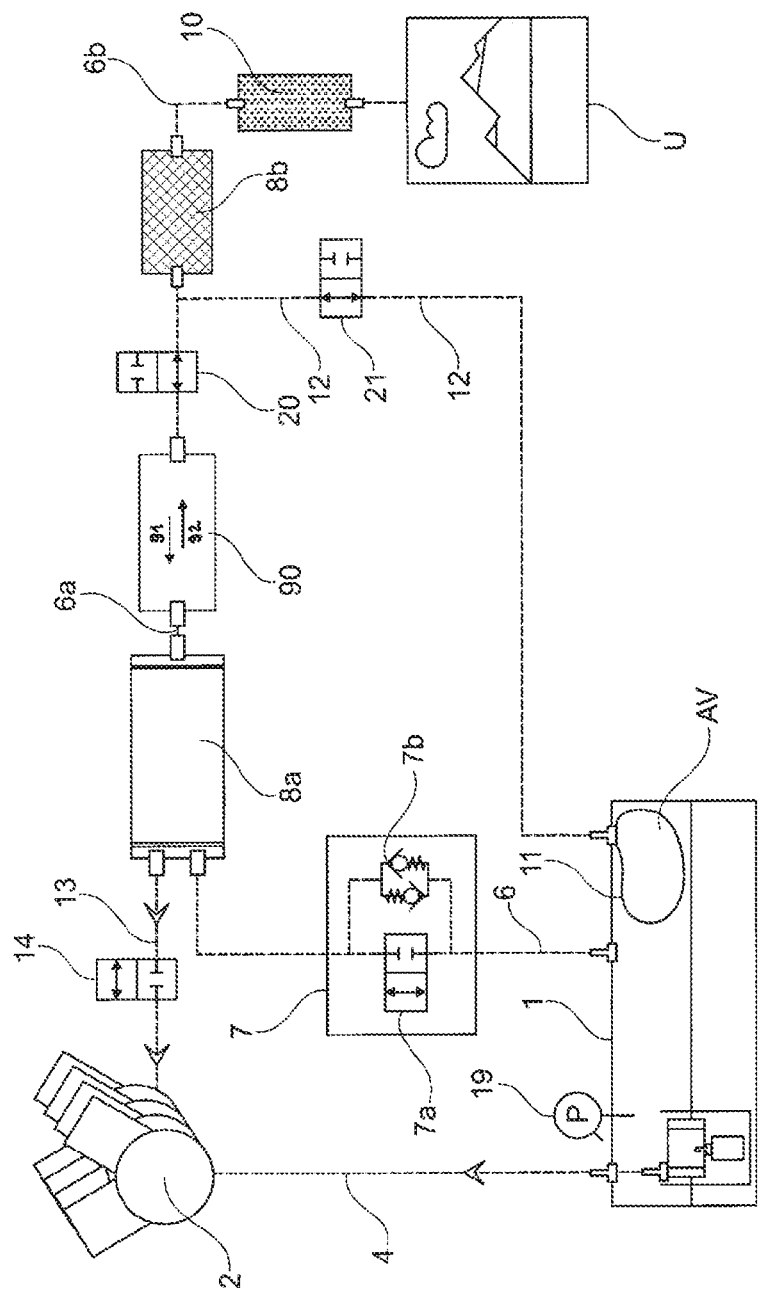
FIG. 1 is a diagrammatic illustration of a fuel supply system in which a leak-tightness testing method according to one or more embodiments of the invention can be carried out (derived from FIG. 1 of the above-cited international patent application PCT/EP2015/065891 and using the reference signs therein).
Figure 2:
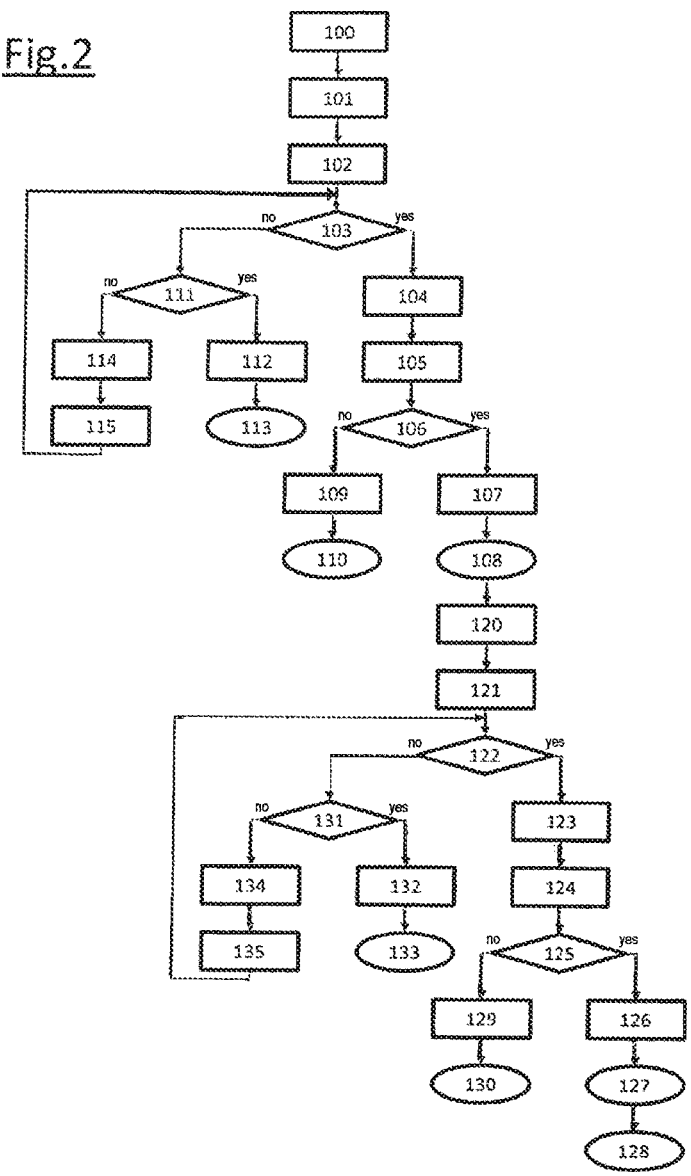
FIG. 2 is a flow diagram of a computer program installed in an electronic control unit.

The invention will be discussed in more detail below on the basis of two exemplary embodiments, wherein appended FIG. 1 (derived from FIG. 1 of the above-cited international patent application PCT/EP2015/065891 and using the reference signs therein) shows, in a diagrammatic illustration, a fuel supply system in which a leak-tightness testing method according to the invention is or can be carried out, which method is illustrated in FIG. 2 as a flow diagram of a computer program installed in an electronic control unit. Furthermore, appended FIG. 3 (derived from FIG. 1 of the above-cited international patent application PCT/EP2015/065891 and using the reference signs therein) shows, in a diagrammatic illustration, a fuel supply system in which an alternative leak-tightness testing method according to the invention is or can be carried out, which method is illustrated in FIG. 4 as a flow diagram of a computer program installed in an electronic control unit.

In the flow diagrams (in FIG. 2 and FIG. 4), rectangles denote actions (of the electronic control unit), whereas a rhombus denotes a query performed (by the control unit) and an ellipse denotes a result determined (by the control unit). The numerals 100 and above denote individual method steps described below.

Referring firstly to FIG. 1, a tank or fuel tank of a motor vehicle is denoted by the reference designation 1, and an internal combustion engine supplied with fuel from said tank is denoted by the reference designation 2. Fuel conveyed by way of a pump unit (not shown) provided in the tank 1 passes to said internal combustion engine 2 via a supply line 4. For the sake of simplicity, the illustration does not show a filler neck via which the tank 1 can be replenished with fuel.

A tank ventilation line 6 leads from the interior space of the tank 1 through a valve unit 7 to a first accumulator unit 8a filled with an adsorbent for gaseous fuel constituents, or the ventilation line 6 opens out in the interior space of an accumulator unit, which functions as a so-called activated carbon filter and which is denoted by the reference designation 8a, for gaseous fuel constituents that are gaseous and discharged from the tank interior space via the ventilation line 6 when the valve unit 7 is open. At the other end of said first accumulator unit 8a, the ventilation line 6 continues as line 6a and, after passing through a gas-conveying device 90 which is designed such that a gas flow can flow through the gas-conveying device 90 even when it is not in operation and after passing through a shut-off valve 20, opens out in a second accumulator unit 8b, also referred to as "honeycomb" or "low bleed emission activated carbon filter", for gaseous fuel constituents, which likewise includes activated carbon but with different storage characteristics. Emerging from said second accumulator unit 8b, the tank ventilation line 6 extends onward as line 6b through a dust filter 10 into the surroundings U. Also provided is a pressure sensor 19 by way of which the interior pressure in the tank 1 can be measured.

A volume-changing element 11 which in this case (in the exemplary embodiments as per FIGS. 1 and 3) is in the form of a flexible and elastically deformable bladder is provided in the interior space of the tank 1. The volume-changing element 11 encloses a compensation volume AV which, via a ventilation line 12, can be connected to the surroundings U or is normally connected to the surroundings U. For this purpose, the ventilation line 12, which opens out in the compensation volume AV of the volume-changing element 11, extends through the wall of the tank 1 and finally opens out in the line 6a which, as already discussed, connects the first accumulator unit 8a to the second accumulator unit 8b. Said ventilation line 12 is thus connected, through the accumulator unit 8b for gaseous fuel constituents, to the surroundings U if a shut-off valve 21 provided in said ventilation line 12, also referred to as bladder shut-off valve 21, is open. The shut-off valve 21 preferably assumes said open state in the electrically deenergized state, whereas the shut-off valve 21 is moved into the closed state when electrically energized. Whereas the function of said shut-off valve 21 will be discussed further below (and is required for the execution of the testing method according to the invention), the function of said volume-changing element 11 is discussed briefly in the introductory part of the present description and is discussed in detail in the international patent application with the file reference PCT/EP2015/065891, as already cited multiple times. This also applies to the function of the valve unit 7, also referred to as low-pressure tank shut-off valve, which in this case is formed by a parallel connection of two valve elements 7a, 7b.

The first valve element 7a is a shut-off valve that is actuatable by an electronic control unit and which is normally moved into its open position during refueling (i.e., filling of the tank 1 with fresh fuel) and in the event of an exceedance of a predefined limit pressure in the tank 1, and which is otherwise closed. In particular, with regard to the avoidance of an overshooting of the limit pressure (both with regard to positive pressure and with regard to negative pressure), the first valve element 7a is suitably actuated by a sensor (not shown) which measures the temperature T in the tank 1 in combination with a sensor 19 which measures the pressure P in the tank 1, while an impending refueling process, or a refueling process being carried out, can be identified for example by way of a refueling demand button for actuation by the user of the motor vehicle, or by way of a tank flap sensor.

Here, the second valve element 7b involves a pairing of mutually oppositely directed check valves which are connected in parallel and which automatically open only in the presence of a minimum pressure. Said check valves and/or said second valve element 7b are/is designed so as to open only in the presence of pressure values in the interior space of the tank 1 (outside the volume-changing element 11) which differ in terms of magnitude by for example 100 mbar from the pressure prevailing in the surroundings U, that is to say said second valve element 7b (which is connected functionally in parallel with the first valve element 7a) of the valve unit 7 opens when a positive pressure of approximately 100 mbar prevails in the tank interior space. As a result, fuel vapors pass out of the tank interior space into the two accumulator units 8a, 8b, where the gaseous fuel constituents are retained, whereas the air passes into the surroundings U, and said positive pressure thus is depleted. Alternatively, when a negative pressure of, for example, approximately 100 mbar prevails in the tank interior space, as a result of which air passes from the surroundings U into the tank interior space through the accumulator units 8a, 8b, and said negative pressure thus is depleted. By contrast to the explanation above, the check valves of the valve element 7b may however also be configured for different differential pressure values and/or different absolute values with regard to their opening, in such a way that the valve element 7b opens from the tank 1 to the surroundings U (or to the accumulator unit 8a) only when a positive-pressure limit value of for example 70 mbar has been reached in the tank 1. The valve element 7b opens from the surroundings U (or from the accumulator unit 8a) to the tank 1 only when a negative-pressure limit value which is smaller, or no higher, in terms of magnitude than the above-mentioned positive-pressure threshold value, and which may for example lie in the region of 30 mbar, is reached in the tank 1. The range within which expedient pressure values lie extends from approximately 5 mbar to approximately 100 mbar.

When the motor vehicle is at a standstill over a practically unlimited or at least relatively high number of days, however, the valve unit 7 should not open at all on a tank system of said type. Rather, then, the varying volume of the fuel situated in the tank interior space, or the change in vapor pressure thereof, owing to varying ambient temperatures (in particular owing to day and night) is compensated exclusively by way of a change in volume of the volume-changing element 11 which, for this purpose, via the open ventilation line 12 (that is to say normally, specifically with the exception of the execution of the testing method claimed here, the shut-off valve 21 provided therein is open) and the second accumulator unit 8b, either discharges air from the compensation volume AV of the volume-changing element 11 to the surroundings or takes in air from the surroundings U. This process of the expansion of the volume-changing element 11 with an enlargement of the compensation volume AV or decrease in size of the volume-changing element 11 with a decrease of the compensation volume AV as a result of exchange of air with the surroundings U can continue practically infinitely with suitable dimensioning of the components involved, without increasing evaporation of fuel in the tank 1 necessitating an opening of the valve unit 7.

A purging or regeneration of the accumulator units 8a, 8b is also performed, which accumulator units, aside from receiving fuel constituents that diffuse through the wall of the volume-changing element 11 into the compensation volume AV thereof, are charged with fuel vapors in particular during a refueling process, that is to say during filling of the tank 1 with fresh fuel and possibly in the event of an exceedance of pressure limit values in the tank 1, as is customary in present tank systems. When the internal combustion engine 2 is in operation, for the purging of the accumulator units 8a, 8b, air from the surroundings U passes via the line 6b into the second accumulator unit 8b and onward through the line 6a and the first accumulator unit 8a through a purge line 13, in which there is provided a purge valve 14 which is then open but is otherwise closed, into the combustion chambers of the internal combustion engine 2, where the gaseous fuel constituents previously temporarily stored in the two accumulator units 8a, 8b and entrained by the purging air are burned.

Following this preliminary explanation, a description will now be given on the basis of FIG. 2 of a procedure according to the invention for testing the leak-tightness of the fuel supply system as per FIG. 1, which is performed by an electronic processing and control unit as follows:

Step 100: start of the testing procedure, for example on the basis of a stoppage of operation or start of operation of the motor vehicle or of the consumer (or internal combustion engine 2).

Step 101: the valve unit 7, more specifically the valve element 7a thereof, which is closed when electrically deenergized, is opened, and the bladder-type shut-off valve 21 which is open in the electrically deenergized state is closed in order to prevent the volume-changing element 11 having any influence on the following part of the testing method.

Step 102: the gas-conveying device 90 is set in operation in the conveying direction illustrated in FIG. 1 by the arrow 91, and thus conveys air from the surroundings U into the interior space of the fuel tank 1, inter alia, through the shut-off valve 20 which is open when electrically deenergized and thus normally open; upon or proceeding from this setting in operation, the operating time duration of the gas-conveying device 90 is also measured.

Step 103: it is checked whether the positive pressure in the tank interior space measured by way of the pressure sensor 19 is greater than for example 10 millibar.

Step 104: if so, the shut-off valve 20 is closed and the gas-conveying device 90 is deactivated.

Step 105: a predefined time period, for example in the region of 1 minute, is allowed to elapse.

Step 106: it is checked (by way of the pressure sensor 19) whether a positive pressure of (for example) at least 5 mbar (in relation to ambient pressure) still prevails in the fuel tank 1—this predefined magnitude, which constitutes a threshold value with regard to the result of the testing method, inevitably lies below the magnitude mentioned or considered in method Step 103.

Step 107: if so, the shut-off valve 20 is firstly opened, and for example one second later, the valve element 7a of the valve unit 7 is closed and the bladder-type shut-off valve 21 is opened in order to restore the normal operating state (and in order to prepare for the method part that follows method Step 108).

Step 108: the fuel tank 1 and the accumulator unit 8a and the associated lines including the purge line 13 can thus be classed as exhibiting an adequate sealing action.

Step 109: if, by contrast, it is identified in Step 106 that the pressure in the tank interior space lies below the value of for example 5 mbar predefined in said step, then the normal operating state is restored analogously to Step 107, but it is then not possible to conclude that leak-tightness is present.

Step 110: rather, then, that partial region of the fuel supply system which includes the fuel tank 1 and the accumulator unit 8a and the associated lines including the purge line 13 is classed as not exhibiting an adequate sealing action (and this is communicated for example to the user of the motor vehicle as has hitherto been customary).

Step 111: if, in method Step 103, it is identified that the positive pressure generated in the tank interior space as a result of prior setting in operation of the gas-conveying device 90 has not (yet) reached the desired value of for example 10 millibar (and thus remains lower than this in terms of magnitude), then it is queried whether the gas-conveying device 90 has already been in operation for 30 seconds, that is to say whether 30 seconds have already elapsed since the execution of method Step 102.

Step 112: if so, the gas-conveying device 90 is deactivated, because it can be assumed that the desired pressure build-up in the tank 1 cannot occur owing to a leak.

Step 113: consequently, that partial region of the fuel supply system which includes the fuel tank 1 and the accumulator unit 8a and the associated lines including the purge line 13 is classed as not exhibiting an adequate sealing action.

Step 114: by contrast, if it is identified in method Step 111 that the gas-conveying device 90 has still been in operation for less than 30 seconds, a time counter for the operating duration thereof is increased by the value "1", and in the following method step.

Step 115: the gas-conveying device 90 is operated for a further second, following which the method returns to method Step 103, in which it is queried whether the positive pressure in the tank interior space measured by way of the pressure sensor 19 is greater than for example 10 millibar.

Returning to method Step 108, the leak-tightness of the volume-changing element 11 is thereafter or subsequently checked. This is performed, only following a successful execution (that is to say an execution which confirms adequate leak-tightness) of the testing method for the fuel tank 1 and the accumulator unit 8a and the associated lines including the purge line 13, in the "indirect" manner mentioned further above by way of the following method steps.

Step 120: the valve unit 7, more specifically the valve element 7a thereof, which is closed in the electrically deenergized state, is opened.

Step 121: the gas-conveying device 90 is set in operation in the conveying direction illustrated in FIG. 1 by the arrow 92 (and thus directed counter to the conveying direction from the method step 102), and thus, inter alia, conveys the air previously conveyed into the tank 1 (specifically in the method Steps 102, 103, and possibly 111, 114, 115) out of the tank 1 partially into the interior space of the volume-changing element 11, but in particular into the surroundings U, which is however not detrimental because the air discharged from the tank 1 is previously conducted through the accumulator units 8a, 8b. Here, upon or proceeding from this setting in operation, the operating time duration of the gas-conveying device 90 is also measured.

Step 122: it is checked whether the negative pressure in the interior space of the tank 1 as measured by way of the pressure sensor 19 and generated by way of the further extraction of air or gas from the tank interior space is lower than for example 10 millibar (in relation to ambient pressure). Here, "lower" means that the magnitude of the negative pressure is greater than 10 millibar.

Step 123: if so, the shut-off valve 20 is closed and the gas-conveying device 90 is deactivated.

Step 124: a predefined time period, for example in the region of 1 minute, is allowed to elapse.

Step 125: it is checked by way of the pressure sensor 19 whether a negative pressure of (for example) at least 5 mbar (in relation to ambient pressure) still prevails in the fuel tank 1—this predefined magnitude, which constitutes a threshold value with regard to the result of the testing method, lies below the magnitude mentioned or considered in method Step 122, because in the event of a leak of the volume-changing element 11, air would pass out of the latter into the tank interior space and would significantly reduce the negative pressure initially prevailing therein.

Step 126: if so, the shut-off valve 20 is firstly opened, and for example one second later, the valve element 7a of the valve unit 7 is closed in order to restore the normal operating state.

Step 127: since, in Step 125, adequate negative pressure still prevails in the tank interior space (and said negative pressure has consequently not been significantly depleted via a leaking volume-changing element 11), the volume-changing element 11 can be classed as exhibiting an adequate sealing action.

Step 128: the hitherto successful testing procedure is thereby concluded, because both the fuel tank 1 and the accumulator unit 8a and the associated lines including the purge line 13, as per Step 108, and also the volume-changing element 11 exhibit an adequate sealing action.

Step 129: if, by contrast, it is identified in Step 125 that the pressure in the tank interior space lies above the negative-pressure threshold value of for example 5 mbar predefined in said step, that is to say that for example only a negative pressure of 1 mbar or even ambient pressure prevails in the tank 1, which is basically possible in the case of a leaking volume-changing element 11, because ambient air can pass into the interior space of the tank 1 through the ventilation line 12 with open shut-off valve 21 and through a leaking volume-changing element 11, then the normal operating state is restored analogously to Step 126, but it is then not possible to conclude that leak-tightness of the volume-changing element 11 is present.

Step 130: rather, then, the volume-changing element 11, or that partial region of the fuel supply system which includes said volume-changing element, is classed as not exhibiting an adequate sealing action.

Step 131: if, in method Step 122, it is identified that the negative pressure in the tank interior space generated as a result of prior setting in operation of the gas-conveying device 90 has not reached the desired value of for example 10 millibar, then it is queried whether the gas-conveying device 90 has already been in operation for, for example, 300 seconds, that is to say whether 300 seconds have already elapsed since the execution of method Step 121.

Step 132: if so, the gas-conveying device 90 is deactivated, because it can be assumed that the desired negative pressure build-up in the tank 1 cannot occur owing to a leak in the volume-changing element 11.

Step 133: consequently, the volume-changing element 11 or that partial region of the fuel supply system which includes said volume-changing element is classed as not exhibiting an adequate sealing action.

Step 134: by contrast, if it is identified in method Step 131 that the gas-conveying device 90 has still been in operation for less than 300 seconds, a time counter for the operating duration thereof is increased by the value "1", and in the following method step.

Step 135: the gas-conveying device 90 is operated for a further second, following which the method returns to method Step 122, in which it is queried whether the negative pressure in the tank interior space measured by way of the pressure sensor 19 is greater in magnitude than for example 10 millibar.

Figure 3:
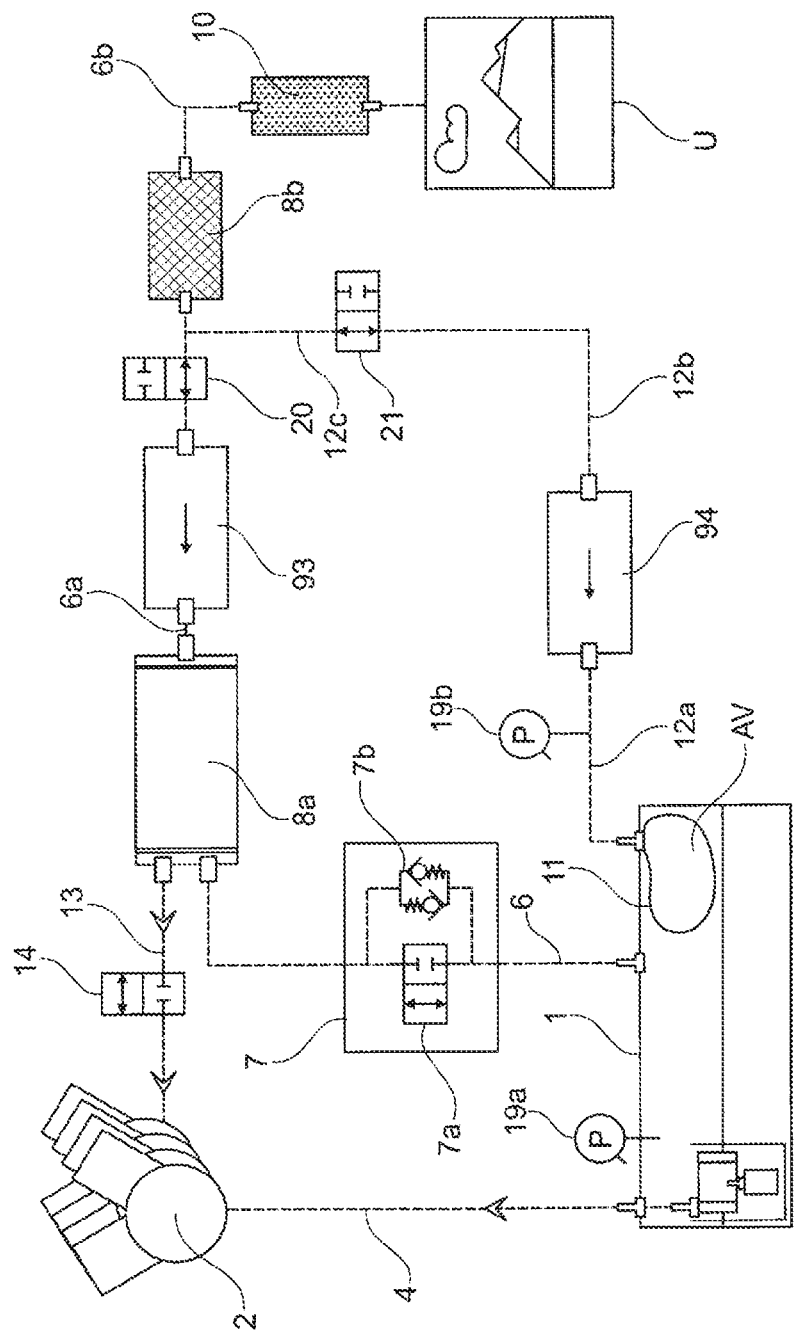
FIG. 3 is a diagrammatic illustration of a fuel supply system in which an alternative leak-tightness testing method according to one or more embodiments of the invention can be carried out (derived from FIG. 1 of the above-cited international patent application PCT/EP2015/065891 and using the reference signs therein).

An alternative embodiment of the present invention will now be discussed below on the basis of FIGS. 3 and 4. Comparing FIG. 3 with FIG. 1 as discussed above, it can be seen in particular that, in FIG. 3, two gas-conveying devices 93, 94 are provided, which have in each case only a single conveying direction illustrated by an arrow that is not designated in any more detail. The first gas-conveying device 93 is arranged in the line section 6a between the accumulator unit 8a and the shut-off valve 20, and can thus convey air from the surroundings U into the tank interior space when the shut-off valve 20 is open. The second gas-conveying device 93 is arranged in the ventilation line 12 between the volume-changing element 11 and the shut-off valve 21, and can thus convey air from the surroundings U into the volume-changing element 11 when the shut-off valve 21 is open. Provided downstream of said gas-conveying device 92 is a pressure sensor 19b for measuring the pressure that prevails in the volume-changing element 11 when the shut-off valve 21 is closed. That which is denoted in FIG. 1 by the reference designation 19 for measuring the pressure in the tank interior space bears the reference designation 19a in FIG. 3.

Following this preliminary explanation, a description will now be given on the basis of FIG. 4 of a procedure according to the invention for testing the leak-tightness of the fuel supply system as per FIG. 3, which is performed by an electronic processing and control unit as follows.

Step 300: start of the testing procedure, for example on the basis of a stoppage of operation or start of operation of the motor vehicle or of the consumer (or internal combustion engine 2).

Step 301: the valve unit 7, more specifically the valve element 7a thereof, which is closed when electrically deenergized, is opened, and the bladder-type shut-off valve 21 which is open in the electrically deenergized state is closed in order to prevent the volume-changing element 11 having any influence on the following part of the testing method.

Step 302: the gas-conveying device 93 is set in operation and thus conveys air from the surroundings U into the interior space of the fuel tank 1, inter alia, through the shut-off valve 20 which is open when electrically deenergized and thus normally open. Upon or proceeding from this setting in operation, the operating time duration of the gas-conveying device 93 is also measured.

Step 303: it is checked whether the positive pressure in the tank interior space measured by way of the pressure sensor 19a is greater than for example 10 millibar.

Step 304: if so, the shut-off valve 20 is closed and the gas-conveying device 93 is deactivated.

Step 305: a predefined time period, for example in the region of 1 minute, is allowed to elapse.

Step 306: it is checked (by way of the pressure sensor 19a) whether a positive pressure of (for example) at least 5 mbar (in relation to ambient pressure) still prevails in the fuel tank 1—this predefined magnitude, which constitutes a threshold value with regard to the result of the testing method, inevitably lies slightly below the magnitude mentioned or considered in method Step 303.

Step 307: if so, the shut-off valve 20 is firstly opened, and for example one second later, the valve element 7a of the valve unit 7 is closed and the bladder-type shut-off valve 21 is opened in order to restore the normal operating state (and in order to prepare for the method part that follows method Step 308).

Step 308: the fuel tank 1 and the accumulator unit 8a and the associated lines including the purge line 13 can thus be classed as exhibiting an adequate sealing action.

Step 309: if, by contrast, it is identified in Step 306 that the pressure in the tank interior space lies below the value of for example 5 mbar predefined in said step, then the normal operating state is restored analogously to Step 307, but it is then not possible to conclude that leak-tightness is present.

Step 310: rather, then, that partial region of the fuel supply system which includes the fuel tank 1 and the accumulator unit 8a and the associated lines including the purge line 13 is classed as not exhibiting an adequate sealing action.

Step 311: if, in method Step 303, it is identified that the positive pressure generated in the tank interior space as a result of prior setting in operation of the gas-conveying device 93 has not (yet) reached the desired value of for example 10 millibar, then it is queried whether the gas-conveying device 93 has already been in operation for 30 seconds, that is to say whether 30 seconds have already elapsed since the execution of method step 302.

Step 312: if so, the gas-conveying device 93 is deactivated, because it can be assumed that the desired pressure build-up in the tank 1 cannot occur owing to a leak.

Step 313: consequently, that partial region of the fuel supply system which includes the fuel tank 1 and the accumulator unit 8a and the associated lines including the purge line 13 is classed as not exhibiting an adequate sealing action.

Step 314: by contrast, if it is identified in method Step 311 that the gas-conveying device 93 has still been in operation for less than 30 seconds, a time counter for the operating duration thereof is increased by the value "1", and in the following method step.

Step 315: the gas-conveying device 93 is operated for a further second, following which the method returns to method Step 303, in which it is queried whether the positive pressure in the tank interior space measured by way of the pressure sensor 19a is greater than for example 10 millibar.

Returning to method Step 308, the leak-tightness of the volume-changing element 11 is thereafter or subsequently checked. This is performed, only following a successful execution (that is to say an execution which confirms adequate leak-tightness) of the testing method for the fuel tank 1 and the accumulator unit 8a and the associated lines including the purge line 13, in the "direct" manner mentioned further above by way of the following method steps.

Step 320: the valve unit 7, more specifically the valve element 7a thereof, which is closed in the electrically deenergized state, is opened in order to prevent the pressure conditions in the interior space of the tank 1 having any influence on the following part of the testing method.

Step 321: the gas-conveying device 94 is set in operation and thus, inter alia, conveys air from the surroundings U into the interior space of the volume-changing element 11. Here, upon or proceeding from this setting in operation, the operating time duration of the gas-conveying device 94 is also measured.

Step 322: it is checked whether a positive pressure measured by way of the pressure sensor 19b downstream of the gas-conveying device 94 is greater than a predefined threshold value of for example 10 millibar (in relation to ambient pressure), which is possible only if the volume-changing element 11 is at least approximately leak-tight.

Step 323: if so, the bladder-type shut-off valve 21 is closed and the gas-conveying device 94 is deactivated.

Step 324: a predefined time period, for example in the region of 1 minute, is allowed to elapse.

Step 325: it is checked by way of the pressure sensor 19b whether a positive pressure of (for example) at least 5 mbar (in relation to ambient pressure) still prevails in the volume-changing element 11—this predefined magnitude, which constitutes a threshold value with regard to the result of the testing method, inevitably lies below the magnitude mentioned or considered in method Step 322, because a certain amount of air can pass to the suction side of the gas-conveying device 94 as far as the bladder-type shut-off valve 21.

Step 326: if so, the bladder-type shut-off valve 21 is firstly opened, and for example one second later, the valve element 7a of the valve unit 7 is closed in order to restore the normal operating state.

Step 327: since, in Step 325, adequate positive pressure still prevails in the volume-changing element 11, the volume-changing element 11 can be classed as exhibiting an adequate sealing action.

Step 328: the hitherto successful testing procedure is thereby concluded, because both the fuel tank 1 and the accumulator unit 8a and the associated lines including the purge line 13, as per Step 308, and also the volume-changing element 11, as per Step 327, exhibit an adequate sealing action.

Step 329: if, by contrast, it is identified in Step 325 that the pressure in the volume-changing element 11 lies below the threshold value of for example 5 mbar predefined in said step, that is to say that for example only a positive pressure of 1 mbar or even ambient pressure prevails, which is basically possible in the case of a leaking volume-changing element 11 because, then, the air 12 conveyed by way of the gas-conveying device 94 can pass via the tank interior space and through the line 6 into the surroundings U, then the normal operating state is restored analogously to Step 326, but it is then not possible to conclude that leak-tightness of the volume-changing element 11 is present.

Step 330: rather, then, the volume-changing element 11, or that partial region of the fuel supply system which includes said volume-changing element, is classed as not exhibiting an adequate sealing action.

Step 331: if, in method Step 322, it is identified that the positive pressure in the volume-changing element 11 generated as a result of prior setting in operation of the gas-conveying device 94 has not reached the desired value of for example 10 millibar, then it is queried whether the gas-conveying device 94 has already been in operation for, for example, 240 seconds, that is to say whether 240 seconds have already elapsed since the execution of method Step 321.

Step 332: if so, the gas-conveying device 94 is deactivated, because it can be assumed that the desired positive pressure build-up in the volume-changing element 11 cannot occur owing to a leak thereof.

Step 333: consequently, the volume-changing element 11 or that partial region of the fuel supply system which includes said volume-changing element is then classed as not exhibiting an adequate sealing action.

Step 334: by contrast, if it is identified in method Step 331 that the gas-conveying device 94 has still been in operation for less than 240 seconds, a time counter for the operating duration thereof is increased by the value "1", and in the following method step.

Step 335: the gas-conveying device 94 is operated for a further second, following which the method returns to method Step 322, in which it is queried whether the positive pressure in the volume-changing element 11 measured by way of the pressure sensor 19b is greater in magnitude than for example 10 millibar.

It is finally expressly pointed out that the foregoing disclosure (e.g., the above-mentioned pressure values or time specifications) has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Thus, the disclosed embodiments should not be construed to limit the scope of protection of the patent claims, and even the method steps may differ from those described above without departing from the scope of protection of the patent claims.

What is claimed is:

1. A method for testing a leak-tightness of a fuel supply system of a motor vehicle, the method comprising:
   providing the fuel supply system, comprising:
     a fuel tank that is selectively connectable, via a vent line, to the surroundings of the vehicle by a valve unit and a shut-off valve,
     a volume-changing element in an interior space of the fuel tank, wherein a compensation volume of the volume-changing element is selectively connectable, via a bladder vent line, to the surrounding of the vehicle by a bladder valve, and
     a gas conveying device arranged on the vent line;
   performing a first sub-process in sequence with a second sub-process, wherein the first sub-process comprises:
     (a) disconnecting, via the bladder valve, the volume-changing element from the surroundings,
     (b) connecting, via the shut-off valve and the valve unit, the fuel tank to the surroundings,
     (c) operating the gas-conveying device to generate a positive differential pressure exceeding a predetermined positive threshold value, in relation to the surroundings, in the interior space of the fuel tank,
     (d) determining, after a first predetermined length of time, whether the positive differential pressure exceeds the predetermined positive threshold value, and wherein the second sub-process comprises:
     (e) connecting, via the bladder valve, the volume-changing element to the surroundings,
     (f) connecting, via the shut-off valve and the valve unit, the fuel tank to the surroundings,
     (g) operating the gas-conveying device to generate a negative differential pressure exceeding a predetermined negative threshold value, in relation to the surroundings, in the interior space of the fuel tank or in the volume-changing element,
     (h) determining, after a second predetermined length of time, whether the negative differential pressure exceeds the predetermined negative threshold value; and
   determining, on the basis of the first and second sub-processes, that the leak-tightness of the fuel supply system is adequate when the positive differential pressure exceeds the predetermined positive threshold value and the negative differential pressure exceeds the predetermined negative threshold value.

2. The method according to claim 1, wherein the compensation volume of the volume-changing element is connected, with an interposition of an accumulator unit for gaseous fuel constituents, to the surroundings.

3. The method according to claim 2, wherein the fuel supply system includes a tank interior space, comprising:
   the interior space of the fuel tank connected to an accumulator unit via the vent line,
   the accumulator unit connected to a consumer via a purge line, the accumulator unit configured to discharge gaseous fuel constituents via the purge line;

wherein the first sub-process tests the tank interior space for leak-tightness through a build-up of the positive differential pressure; and wherein the second sub-process tests the volume-changing element with the bladder vent line for leak-tightness through a build-up of the negative differential pressure.

4. The method according to claim 1, wherein the fuel supply system includes a tank interior space, comprising:
the interior space of the fuel tank connected to an accumulator unit via the vent line,
the accumulator unit connected to a consumer via a purge line, the accumulator unit configured to discharge gaseous fuel constituents via the purge line;
wherein the first sub-process tests the tank interior space for leak-tightness through a build-up of the positive differential pressure; and
wherein the second sub-process tests the volume-changing element with the bladder vent line for leak-tightness through a build-up of the negative differential pressure.

5. The method according to claim 1, wherein a conveying direction of the gas-conveying device is reversed between the first and second sub-processes.

6. The method according to claim 1, further comprising:
determining the leak-tightness as inadequate if either of the predetermined positive threshold value or the predetermined negative threshold value has not been reached after a predefined operating duration of the gas-conveying device during the respective sub-process.

7. A method for testing a leak-tightness of a fuel supply system of a motor vehicle, the method comprising:
providing the fuel supply system, comprising:
a fuel tank that is selectively connectable, via a vent line, to the surroundings of the vehicle by a valve unit and a shut-off valve,
a volume-changing element in an interior space of the fuel tank, wherein a compensation volume of the volume-changing element is selectively connectable, via a bladder vent line, to the surrounding of the vehicle by a bladder valve,
a first gas conveying device arranged on the vent line, and
a second gas conveying device arranged on the bladder vent line;
performing a first sub-process in sequence with a second sub-process, wherein the first sub-process comprises:
(a) disconnecting, via the bladder valve, the volume-changing element from the surroundings,
(b) connecting, via the shut-off valve and the valve unit, the fuel tank to the surroundings,
(c) operating the first gas-conveying device to generate a positive differential pressure exceeding a predetermined positive threshold value, in relation to the surroundings, in the interior space of the fuel tank,
(d) determining, after a first predetermined length of time, whether the positive differential pressure exceeds the predetermined positive threshold value, and wherein the second sub-process comprises:
(e) connecting, via the bladder valve, the volume-changing element to the surroundings,
(f) connecting, via the shut-off valve and the valve unit, the fuel tank to the surroundings,
(g) operating the second gas-conveying device to generate a negative differential pressure exceeding a predetermined negative threshold value, in relation to the surroundings, in the interior space of the fuel tank or in the volume-changing element,
(h) determining, after a second predetermined length of time, whether the negative differential pressure exceeds the predetermined negative threshold value; and
determining, on the basis of the first and second sub-processes, that the leak-tightness of the fuel supply system is adequate when the positive differential pressure exceeds the predetermined positive threshold value and the negative differential pressure exceeds the predetermined negative threshold value.

8. The method according to claim 7, wherein the compensation volume of the volume-changing element is connected, with an interposition of an accumulator unit for gaseous fuel constituents, to the surroundings.

9. The method according to claim 7,
wherein the fuel supply system includes a tank interior space, comprising:
the interior space of the fuel tank connected to an accumulator unit via the vent line,
the accumulator unit connected to a consumer via a purge line, the accumulator unit configured to discharge gaseous fuel constituents via the purge line;
wherein the first sub-process tests the tank interior space for leak-tightness through a build-up of the positive differential pressure; and
wherein the second sub-process tests the volume-changing element with the bladder vent line for leak-tightness through a build-up of the negative differential pressure.

10. The method according to claim 7, further comprising:
determining the leak-tightness as inadequate if either of the predetermined positive threshold value or the predetermined negative threshold value has not been reached after a predefined operating duration of the gas-conveying device during the respective sub-process.

* * * * *